(12) United States Patent
Umayahara

(10) Patent No.: US 8,642,224 B2
(45) Date of Patent: Feb. 4, 2014

(54) FUEL CELL SYSTEM WITH A LEARNING CAPABILITY TO READJUST THE DRIVING CHARACTERISTIC OF A GAS SUPPLY DEVICE AND VEHICLE

(75) Inventor: Kenji Umayahara, Aichi (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 385 days.

(21) Appl. No.: 12/085,531

(22) PCT Filed: Dec. 5, 2006

(86) PCT No.: PCT/JP2006/324616
§ 371 (c)(1),
(2), (4) Date: May 27, 2008

(87) PCT Pub. No.: WO2007/069553
PCT Pub. Date: Jun. 21, 2007

(65) Prior Publication Data
US 2009/0169936 A1  Jul. 2, 2009

(30) Foreign Application Priority Data

Dec. 15, 2005  (JP) ................................. 2005-361984

(51) Int. Cl.
*H01M 8/04* (2006.01)
(52) U.S. Cl.
USPC ........................................................ 429/444
(58) Field of Classification Search
USPC .................................................... 429/22, 23
See application file for complete search history.

(56) References Cited

U.S. PATENT DOCUMENTS

| | | | | |
|---|---|---|---|---|
| 3,915,747 A * | 10/1975 | Summers et al. | ............ | 429/416 |
| 2002/0022171 A1* | 2/2002 | Saito et al. | ........................ | 429/34 |
| 2005/0023083 A1* | 2/2005 | Reimer | ........................ | 182/186.3 |
| 2006/0134478 A1* | 6/2006 | Fuse | ................................. | 429/22 |
| 2007/0082235 A1* | 4/2007 | Sinha et al. | ........................ | 429/13 |
| 2008/0220303 A1* | 9/2008 | Yoshida | ........................ | 429/25 |

FOREIGN PATENT DOCUMENTS

| | | | |
|---|---|---|---|
| JP | 03-185242 A | | 8/1991 |
| JP | 06-275300 | | 9/1994 |
| JP | 08-004579 A | | 1/1996 |
| JP | 2004-108160 A | | 4/2004 |
| JP | 2004-207024 A | | 7/2004 |
| JP | 2004-342386 A | | 12/2004 |
| JP | 2004-349068 A | | 12/2004 |
| JP | 2005-054949 A | | 3/2005 |
| JP | 2005-129427 A | | 5/2005 |

(Continued)

*Primary Examiner* — Barbara Gilliam
*Assistant Examiner* — Stephan Essex
(74) *Attorney, Agent, or Firm* — Kenyon & Kenyon LLP

(57) ABSTRACT

The present invention relates to a fuel cell system including a fuel cell, a hydrogen gas piping system for supplying a hydrogen gas to the fuel cell, an injector which adjusts a gas state on an upstream side of the hydrogen gas piping system to supply the gas to a downstream side, and a control device which drives and controls the injector in a predetermined driving period, wherein a driving characteristic of the injector is learnt, and a driving parameter of the injector can be set based on a result of the learning. In the present invention, during an operation of the fuel cell, a supply pressure of the hydrogen gas can appropriately be changed in accordance with an operation state. In addition, even when the pressure is broadly varied, a satisfactory pressure response property can be secured regardless of fluctuations due to aging and individual difference of the injector.

12 Claims, 5 Drawing Sheets

(56) References Cited

FOREIGN PATENT DOCUMENTS

| JP | 2005-150018 A | 6/2005 |
| JP | 2005-150090 A | 6/2005 |
| JP | 2005-283127 A | 10/2005 |
| JP | 2005-327596 A | 11/2005 |
| WO | WO 2004105165 A2 * | 12/2004 |
| WO | WO 2005088755 A1 * | 9/2005 |

* cited by examiner

FUEL CELL SYSTEM WITH A LEARNING CAPABILITY TO READJUST THE DRIVING CHARACTERISTIC OF A GAS SUPPLY DEVICE AND VEHICLE

This is a 371 national phase application of PCT/JP2006/324616 filed Dec. 5, 2006, which claims priority of Japanese Patent Application No. 2005-361984 filed Dec. 15, 2005, the contents of which are incorporated herein by reference.

BACKGROUND

The present invention relates to a fuel cell system and a vehicle.

At present, a fuel cell system including a fuel cell which receives supply of a reactive gas (a fuel gas and an oxidizing gas) to generate a power has been suggested and put to practical use. Such a fuel cell system is provided with a fuel supply channel for supplying, to the fuel cell, the fuel gas supplied from a fuel supply source such as a hydrogen tank.

Moreover, a fuel cell system is known including a variable pressure adjustment valve capable of exerting a pressure applied from a pressure source of the oxidizing gas to adjust a pressure of the fuel gas to be supplied to the fuel cell, as a pressure adjustment valve which is provided on the fuel supply channel and which adjusts the pressure of the fuel gas to be supplied to the fuel cell (e.g., see Japanese Patent Application Laid-Open Nos. 2005-150090, 2004-342386).

SUMMARY

According to the variable pressure adjustment valve disclosed in Japanese Patent Application Laid-Open No. 2005-150090, a supply pressure of a fuel gas can be changed in accordance with an operating situation. However, even such a variable pressure adjustment valve is unavoidably influenced by aging and individual difference, and a pressure adjustment precision and a pressure response property are sometimes lowered.

The present invention has been developed in view of such a situation, and an object thereof is that a supply pressure of a fuel gas can appropriately be changed in accordance with an operating state of a fuel cell to minimize influences of aging and individual difference and secure a satisfactory pressure response property.

To achieve the above object, a fuel cell system according to the present invention is a fuel cell system comprising: a fuel cell; a fuel supply system which supplies a fuel gas to this fuel cell; a gas state variable supply device which adjusts a gas state on an upstream side of this fuel supply system to supply the gas to a downstream side; and control means for driving and controlling the gas state variable supply device in accordance with an operation state of the fuel cell (an amount of a power to be generated by the fuel cell (a power, a current and a voltage), a temperature of the fuel cell, an abnormal state of the fuel cell system, an abnormal state of a fuel cell main body or the like), the fuel cell system being provided with learning means for learning a driving characteristic of the gas state variable supply device to set a driving parameter of the gas state variable supply device based on a result of the learning.

According to such a constitution, fluctuations of the driving characteristic of the gas state variable supply device due to aging and individual difference are learnt, and the learning result can be reflected in driving and controlling the gas state variable supply device. It is to be noted that the "gas state" is a state (a flow rate, a pressure, a temperature, a molar concentration or the like) of the gas, and especially includes at least one of the gas flow rate and the gas pressure.

The gas state variable supply device may be an electromagnetic driving system injector including an inner channel which connects the upstream side of the gas state variable supply device to the downstream side thereof, a valve body which is movably arranged in the inner channel and in which an opening area of the inner channel is varied in accordance with a movement position of the valve body, and a valve body driving section which drives the valve body with an electromagnetic driving force. Alternatively, the device may be a variable pressure adjustment regulator such as a diaphragm type regulator in which a valve body is driven by, for example, an air pressure or a motor via a diaphragm.

Examples of the driving characteristic of the gas state variable supply device include a relation between an inlet-side gas state of the fuel cell (a secondary gas state of the gas state variable supply device) and an inlet-side target gas state (a secondary target gas state of the gas state variable supply device), a relation between the inlet-side gas state of the fuel cell (the secondary gas state of the gas state variable supply device) and a generated current, a relation between a primary gas state and the secondary gas state of the gas state variable supply device, and a relation between the primary gas state of the gas state variable supply device and the generated current of the fuel cell.

Examples of the driving parameter of the gas state variable supply device include a jet amount, a jet time, a duty ratio, a driving frequency and a driving pulse in a case where the gas state variable supply device is the above electromagnetic driving system injector, and the examples include an applied pressure (e.g., a fluid pressure or a spring pressure) to urge the valve body in an opening or closing direction via the diaphragm in a case where the gas state variable supply device is the diaphragm type regulator.

In the fuel cell system of the present invention, the learning means may learn the driving characteristic of the gas state variable supply device for each of a plurality of learning zones corresponding to an output of the fuel cell. Alternatively, the learning means may learn the driving characteristic of the gas state variable supply device in accordance with the state of the fuel gas to be supplied to the fuel cell.

According to these constitutions, the learning of the driving characteristic of the gas state variable supply device is performed in accordance with the output of the fuel cell or the state of the fuel gas actually supplied to the fuel cell, so that precision of the learning improves. Moreover, the learning can be performed during an operation of the fuel cell. Furthermore, even when the gas state is broadly varied (adjusted), deterioration of pressure adjustment precision due to the aging and the individual difference can be inhibited.

Examples of the output of the fuel cell include the generated current. Moreover, examples of the state of the fuel gas to be supplied to the fuel cell include a pressure and a flow rate of the fuel gas to be supplied to the fuel cell, the primary pressure of the gas state variable supply device, and a combination of at least one of the pressure and the flow rate with another state.

In the fuel cell system of the present invention, the learning means may perform the learning at a time when fluctuations of the generated current of the fuel cell and the pressure of the fuel gas to be supplied to the fuel cell (the gas state of the fuel gas) are constant or less. Moreover, while an off gas of the fuel gas discharged from the fuel cell is purged from the fuel supply system, the learning means may prohibit the learning.

According to these constitutions, wrong learning on conditions which are not suitable for the learning is inhibited, so that precision of the driving control based on the learning result improves.

In the fuel cell system of the present invention, during system manufacturing, the driving parameter may be set based on individual difference of the gas state variable supply device.

According to such a constitution, the driving parameter of the gas state variable supply device can be optimized regardless of the individual difference before the fuel cell system is handed to a user.

A vehicle according to the present invention includes the fuel cell system.

Such a constitution includes the fuel cell system capable of driving and controlling the gas state variable supply device in which fluctuations due to aging and individual difference are reflected, so that a satisfactory pressure response property can be secured.

According to the present invention, there can be provided a fuel cell system having a satisfactory pressure response property regardless of aging and individual difference of a gas state variable supply device, and a vehicle.

DETAILED DESCRIPTION

A fuel cell system 1 according to an embodiment of the present invention will hereinafter be described with reference to the drawings. In the present embodiment, an example in which the present invention is applied to a car-mounted power generation system of a fuel cell vehicle (a vehicle) will be described. First, a constitution of the fuel cell system 1 according to the embodiment of the present invention will be described with reference to FIG. 1.

Figure 1:
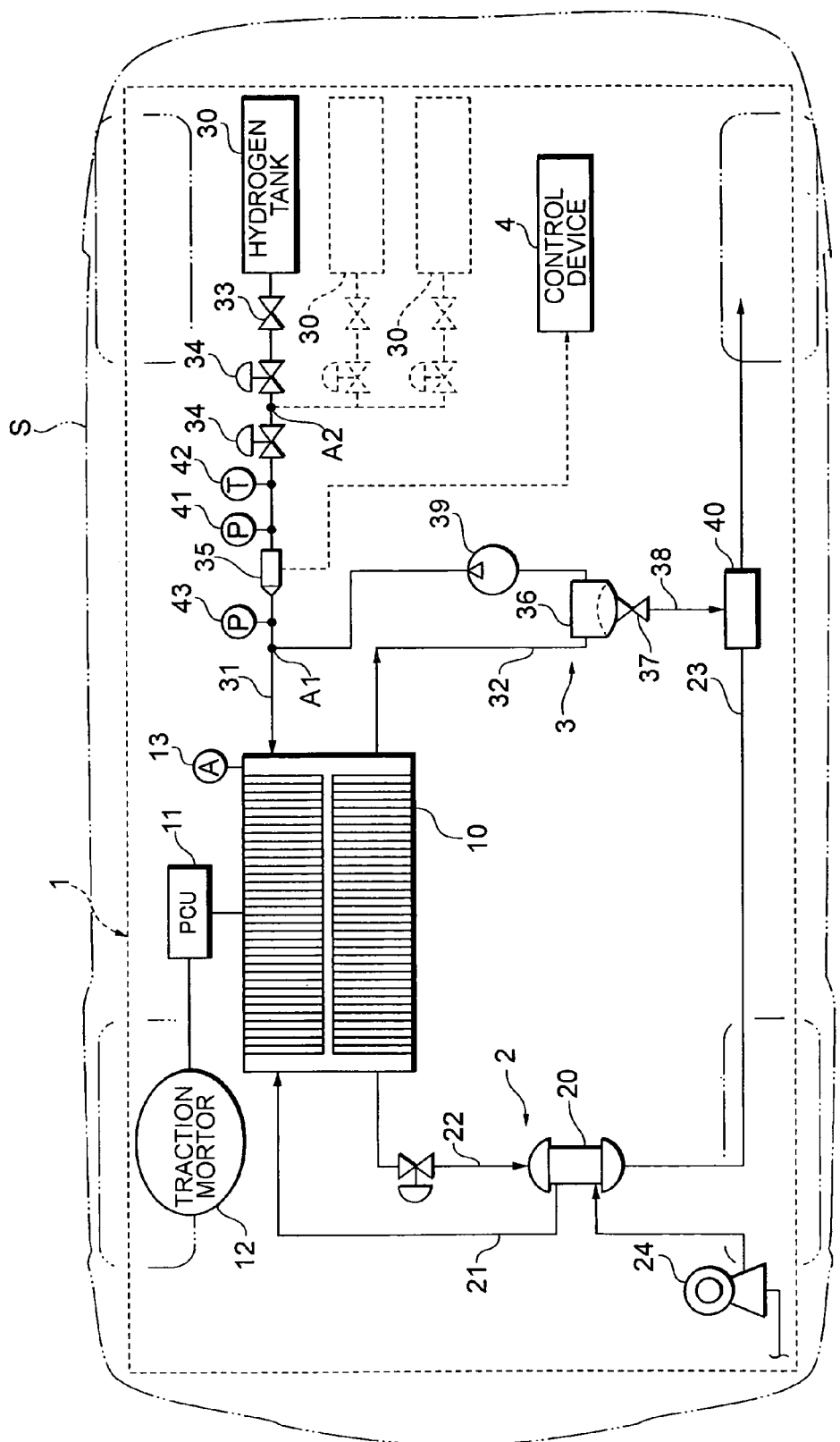
FIG. 1 is a constitution diagram of a fuel cell system according to an embodiment of the present invention.

As shown in FIG. 1, the fuel cell system 1 according to the present embodiment includes a fuel cell 10 which receives supply of a reactive gas (an oxidizing gas and a fuel gas) to generate a power, and the system also includes an oxidizing gas piping system (a fuel supply system) 2 which supplies air as the oxidizing gas to the fuel cell 10, a hydrogen gas piping system 3 which supplies a hydrogen gas as the fuel gas to the fuel cell 10, a control device (control means, learning means) 4 which integrally controls the whole system and the like.

The fuel cell 10 has a stack structure in which a required number of unitary cells for receiving the supply of the reactive gas to generate the power are stacked, and the power generated by the fuel cell 10 is supplied to a power control unit (PCU) 11. The PCU 11 includes an inverter arranged between the fuel cell 10 and a traction motor 12, a DC-DC converter and the like. Moreover, a current sensor 13 which detects a current during the power generation is attached to the fuel cell 10.

The oxidizing gas piping system 2 includes an air supply channel 21 which supplies the oxidizing gas (air) humidified by a humidifier 20 to the fuel cell 10, an air discharge channel 22 which guides, to the humidifier 20, an oxidizing off gas discharged from the fuel cell 10, and an exhaust channel 23 for guiding the oxidizing off gas from the humidifier 20. The air supply channel 21 is provided with a compressor 24 which takes the oxidizing gas from atmospheric air to feed the gas under pressure to the humidifier 20.

The hydrogen gas piping system 3 includes a hydrogen tank 30 as a fuel supply source which receives the hydrogen gas having a high pressure (e.g., 70 MPa), a hydrogen supply channel 31 as a fuel supply channel for supplying the hydrogen gas of the hydrogen tank 30 to the fuel cell 10, and a circulation channel 32 for returning, to the hydrogen supply channel 31, a hydrogen off gas discharged from the fuel cell 10. The hydrogen gas piping system 3 is one embodiment of a fuel supply system of the present invention.

It is to be noted that instead of the hydrogen tank 30, a reformer which forms a hydrogen-rich reformed gas from a hydrocarbon-based fuel, and a high-pressure gas tank which brings the reformed gas formed by this reformer into a high-pressure state to accumulate the pressure may be employed as the fuel supply source. Alternatively, a tank having a hydrogen-gas absorbing alloy may be employed as the fuel supply source.

The hydrogen supply channel 31 is provided with a block valve 33 which blocks or allows the supply of the hydrogen gas from the hydrogen tank 30, a regulator 34 which adjusts the pressure of the hydrogen gas, and an injector (a gas state variable supply device) 35. On an upstream side of the injector 35, a primary pressure sensor 41 and a temperature sensor 42 which detect a pressure and a temperature of the hydrogen gas in the hydrogen supply channel 31, respectively, are provided. Furthermore, on a downstream side of the injector 35 which is an upstream side of a joining portion of the hydrogen supply channel 31 and the circulation channel 32, there is provided a secondary pressure sensor 43 which detects a pressure of the hydrogen gas in the hydrogen supply channel 31.

The regulator 34 is a device which adjusts an upstream pressure (a primary pressure) of the regulator into a beforehand set secondary pressure. In the present embodiment, a mechanical pressure reduction valve which reduces the primary pressure is employed as the regulator 34. As a constitution of the mechanical pressure reduction valve, a known constitution may be employed which has a housing provided with a back pressure chamber and a pressure adjustment chamber formed via a diaphragm and in which the primary pressure is reduced into a predetermined pressure owing to a back pressure of the back pressure chamber to form a secondary pressure in the pressure adjustment chamber.

In the present embodiment, as shown in FIG. 1, two regulators 34 are arranged on the upstream side of the injector 35, whereby the upstream pressure of the injector 35 can effectively be reduced. Therefore, a degree of freedom in design of a mechanical structure (a valve body, a housing, a channel, a driving device and the like) of the injector 35 can be raised.

Moreover, the upstream pressure of the injector 35 can be reduced, so that it can be prevented that the valve body of the injector 35 does not easily move owing to increase of a pressure difference between the upstream pressure and a downstream pressure of the injector 35. Therefore, a variable pressure adjustment range of the downstream pressure of the injector 35 can be broadened, and lowering of a response property of the injector 35 can be inhibited.

The injector 35 is an electromagnetic driving type opening/closing valve in which the valve body is directly driven with an electromagnetic driving force in a predetermined driving period and disposed away from a valve seat, whereby a gas state such as a gas flow rate or a gas pressure can be adjusted. The injector 35 includes the valve seat having jet holes which jet a gas fuel such as the hydrogen gas, and also includes a nozzle body which supplies and guides the gas fuel to the jet holes, and the valve body movably received and held in an axial direction (a gas flow direction) with respect to this nozzle body to open and close the jet holes.

In the present embodiment, the valve body of the injector 35 is driven by a solenoid which is an electromagnetic driving device, and a pulse-like excitation current supplied to this solenoid can be turned on or off to switch an opening area of each jet hole in two stages, multiple stages, a continuous (stepless) manner or a linear manner. A gas jet time and a gas jet timing of the injector 35 are controlled based on a control signal output from the control device 4, whereby a flow rate and a pressure of the hydrogen gas are precisely controlled.

In the injector 35, the valve (the valve body and the valve seat) is directly driven with the electromagnetic driving force to open or close, and a driving period of the valve can be controlled into a highly responsive region, so that the injector has a high response property.

In the injector 35, to supply the gas with a demanded flow rate to the downstream side of the injector, at least one of an opening area (an open degree) and an opening time of the valve body provided in a gas channel of the injector 35 is changed, whereby a flow rate (or a hydrogen molecular concentration) of the gas to be supplied to the downstream side (a fuel cell 10 side) is adjusted.

It is to be noted that the valve body of the injector 35 is opened or closed to adjust the gas flow rate, and the pressure of the gas to be supplied to the downstream side of the injector 35 is reduced as compared with the gas pressure on the upstream side of the injector 35, so that the injector 35 can be interpreted as a pressure adjustment valve (a pressure reduction valve, a regulator). Moreover, in the present embodiment, the injector can be interpreted as a variable pressure adjustment valve capable of changing an adjustment amount (a reduction amount) of the upstream gas pressure of the injector 35 so that the pressure meets a demanded pressure in a predetermined pressure range based on a gas demand.

It is to be noted that in the present embodiment, as shown in FIG. 1, the injector 35 is arranged on the upstream side of a joining portion A1 of the hydrogen supply channel 31 and the circulation channel 32. Moreover, as shown by broken lines in FIG. 1, in a case where a plurality of hydrogen tanks 30 are employed as a fuel supply source, the injector 35 is arranged on the downstream side of a portion (a hydrogen gas joining portion A2) in which the hydrogen gases supplied from the hydrogen tanks 30 are joined.

The circulation channel 32 is connected to a discharge channel 38 via a gas-liquid separator 36 and an exhaust discharge valve 37. The gas-liquid separator 36 collects a water content from the hydrogen off gas. The exhaust discharge valve 37 operates based on a command from the control device 4 to discharge (purge), from the system, the water content collected by the gas-liquid separator 36 and the hydrogen off gas including impurities in the circulation channel 32.

Moreover, the circulation channel 32 is provided with a hydrogen pump 39 which pressurizes the hydrogen off gas in the circulation channel 32 to feed the gas toward the hydrogen supply channel 31. It is to be noted that the gas in the discharge channel 38 is diluted by a diluter 40 to join the gas in the exhaust channel 23.

The control device 4 detects an operation amount of an acceleration operating device (an accelerator or the like) provided in a vehicle S, and receives control information such as a demanded acceleration value (e.g., a demanded power generation amount from a load device such as the traction motor 12) to control operations of various units in the system.

It is to be noted that the load device is a generic power consumption device including, in addition to the traction motor 12, an auxiliary device (e.g., the compressor 24, the hydrogen pump 39, a motor of a cooling pump or the like) required for operating the fuel cell 10, an actuator for use in any type of device (a change gear, a wheel control device, a steering device, a suspension device or the like) associated with running of the vehicle S, an air conditioning device (an air conditioner) of a passenger space, illumination or audio.

The control device 4 is constituted of a computer system (not shown). Such a computer system is constituted of a CPU, an ROM, an RAM, an HDD, an input/output interface, a display and the like, and the CPU reads any type of control program recorded in the ROM to execute the program, whereby various control operations are realized.

Figure 2:
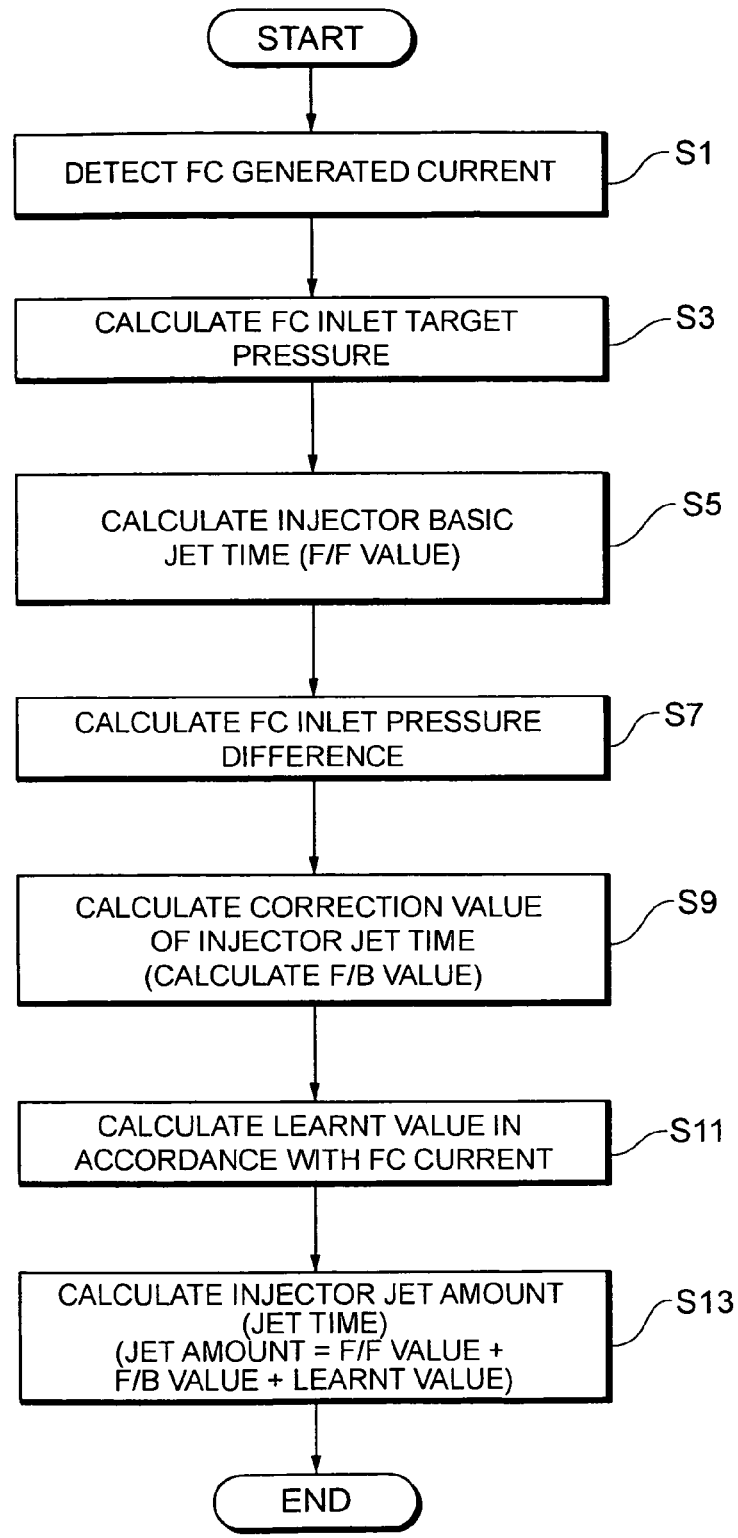
FIG. 2 is a flow chart showing a calculation process of an injector jet time in the fuel cell system shown in FIG. 1.
Figure 3:
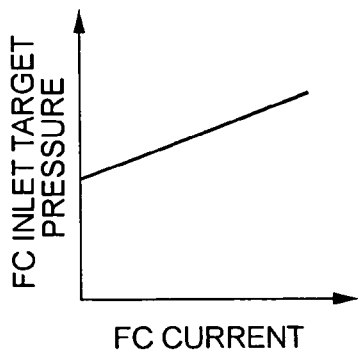
FIG. 3 shows one example of a map for use in processing of step S3 of the flow chart shown in FIG. 2.

Specifically, as shown in a flow chart of FIG. 2, the control device 4 detects a generated current (hereinafter referred to as an FC current) of the fuel cell 10 with the current sensor 13 (step S1), and obtains an FC inlet target pressure from the FC current detected in the step S1 by use of, for example, a map shown in FIG. 3, that is, a map showing a relation between the FC current detected in the step S1 and an inlet target pressure (hereinafter referred to as the FC inlet target pressure) of the fuel cell 10 set corresponding to a demand output with respect to the fuel cell 10 (step S3).

Figure 4:
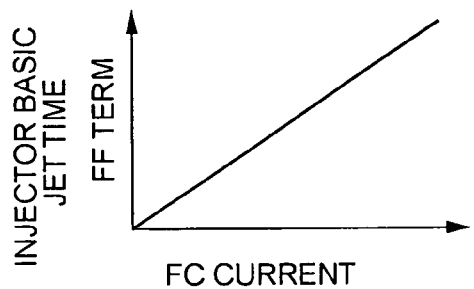
FIG. 4 shows one example of a map for use in processing of step S5 of the flow chart shown in FIG. 2.

Subsequently, the control device 4 obtains an F/F value as a basic jet time of the injector from the FC current detected in the step S1 by use of, for example, a map shown in FIG. 4, that is, a map showing a relation between the FC current and a feedforward term (hereinafter referred to as the F/F value) as the basic jet time of the injector (step S5).

Subsequently, the control device 4 obtains a difference (hereinafter referred to as the FC inlet pressure difference) between the FC inlet target pressure obtained in the step S3 and a present inlet pressure (hereinafter referred to as an FC inlet pressure) of the fuel cell 10 detected by the secondary pressure sensor 43 (step S7), and the control device obtains a feedback term (hereinafter referred to as the F/B value) of the injector jet time as a correction value for correcting (reducing) this FC inlet pressure difference (step S9).

Subsequently, the control device 4 obtains, from the FC current detected in the step S1, a learnt value of the injector jet time as a learning term for correcting fluctuations of the flow rate due to the aging and individual difference of the injector 35 by use of, for example, a map shown in FIG. 5, that is, a map showing a relation between the FC current and the learnt value (step S11).

Figure 5:
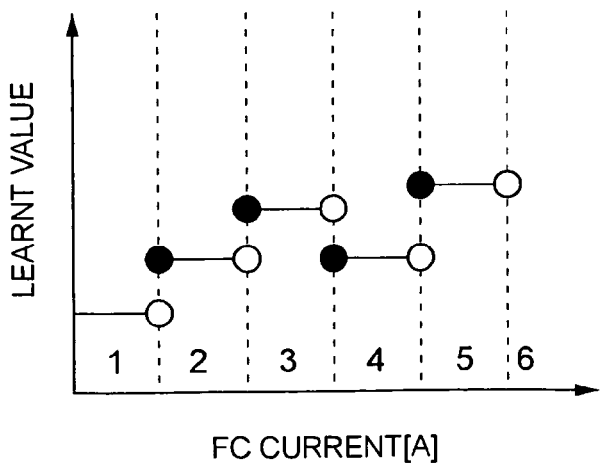
FIG. 5 shows one example of a map for use in processing of step S11 of the flow chart shown in FIG. 2.

In this map shown in FIG. 5, the learnt value switches for each constant FC current zone (zones 1 to 6 divided by broken lines in FIG. 5), that is, the learnt value switches for each of a plurality of learning zones corresponding to an output of the fuel cell 10. This learnt value is appropriately updated based on an operation state of the fuel cell 10 as described later in detail.

Subsequently, the control device 4 adds the F/B value obtained in the step S9 and the learnt value obtained in the step S11 to the F/F value which is the basic jet time of the injector 35 obtained in the step S3, to obtain the jet time (a jet amount) of the injector 35 (step S13).

It is to be noted that in the present embodiment, the jet holes of the injector 35 switch in two stages of totally opened and closed stages, and this totally opened/closed period is set to a constant value, so that there is a constant correlation between the jet amount and the jet time.

Then, the control device 4 outputs a control signal for realizing such a jet time to the injector 35 to control the jet time and the jet timing of the injector 35 and adjust the flow rate and the pressure of the hydrogen gas to be supplied to the fuel cell 10.

Figure 6:
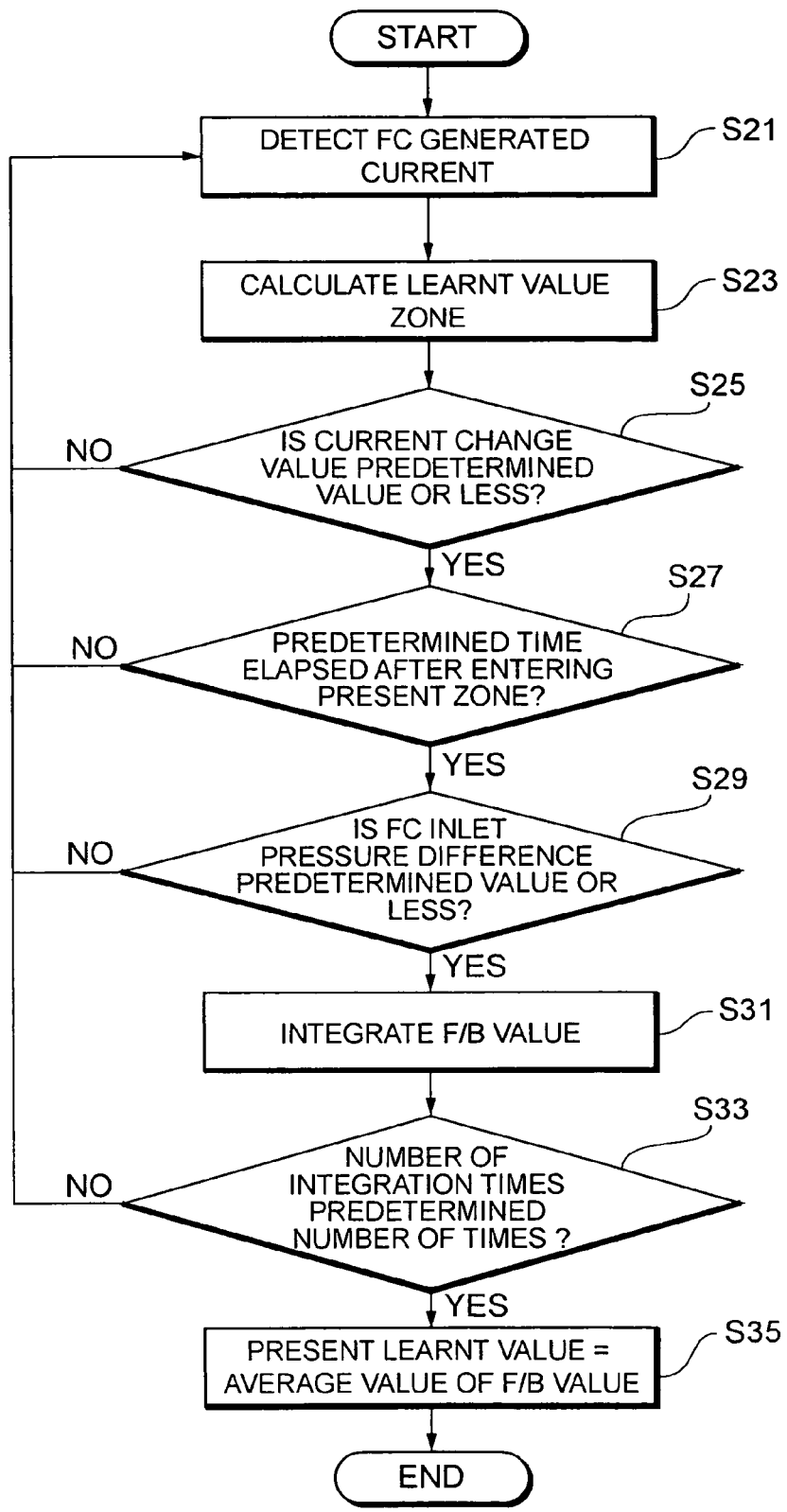
FIG. 6 is a flow chart showing a calculation process of a learnt value in the map for use in the processing of the step S11 of the flow chart shown in FIG. 2.

Next, a calculation flow of the learnt value used in the step S11 of FIG. 2 will be described with reference to a flow chart of FIG. 6.

Figure 7:
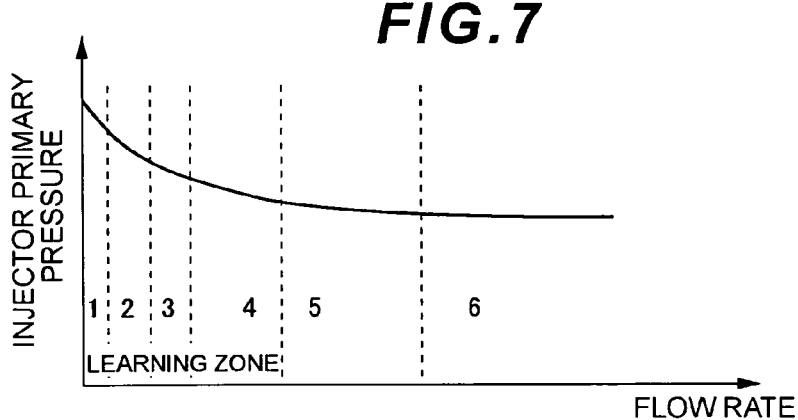
FIG. 7 shows one example of a map for use in processing of step S23 of the flow chart shown in FIG. 6.

Specifically, the control device 4 detects the generated current (the FC current) of the fuel cell 10 with the current sensor 13 (step S21), and obtains a learning zone to be learnt from the hydrogen gas flow rate by use of, for example, a map shown in FIG. 7, that is, a map showing a relation among the hydrogen gas flow rate corresponding to the FC current, the primary pressure (the upstream pressure) of the injector 35 and the learning zone (a plurality of learning zones corresponding to the output of the fuel cell) set for each predetermined hydrogen gas flow rate range (step S23).

It is to be noted that in the present embodiment, as shown in FIG. 7, six learning zones divided by broken lines for each hydrogen gas flow rate, in other words, for each FC current are set.

Figure 8:
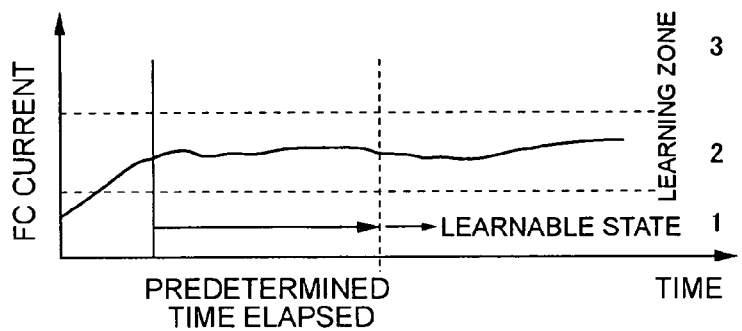
FIG. 8 is a diagram showing processing of steps S25, S27 of the flow chart shown in FIG. 6.

Subsequently, it is judged whether a change value of the FC current detected by the current sensor 13 is a predetermined value or less (a fluctuation of the generated current of the fuel cell is constant or less) (step S25, FIG. 8). When this change value of the FC current exceeds the predetermined value (step S25: NO), the flow returns to the step S21. When the value is the predetermined value or less (step S25: YES), it is judged whether or not a predetermined time has elapsed after entering the present current zone (step S27, FIG. 8). In these steps S25, S27, it is judged whether the state is a steady state, based on the current change value and the elapsed time after entering the present current zone.

Figure 9:
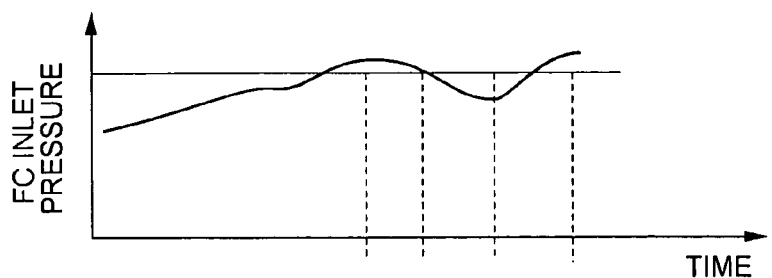
FIG. 9 is a diagram showing processing of step S29 of the flow chart shown in FIG. 6.

In a case where the predetermined time has not elapsed after entering the present current zone (step S27: NO), the flow returns to the step S21. In a case where the predetermined time has elapsed (step S27: YES), it is judged whether or not the FC inlet pressure difference obtained in the same manner as in the step S7 of FIG. 2 is a predetermined value or less (the fluctuation of the fuel gas pressure to be supplied to the fuel cell is constant or less) (step S29, FIG. 9). This processing of the step S29 judges whether or not the learnt value set based on the FC inlet pressure difference in step S33 described later can be in an appropriate range, that is, in a learnable state suitable for the learning.

When the value does not have the learnable state (step S29: NO), the flow returns to the step S21. When the value has the learnable state (step S29: YES), a previous value and a present value of the feedback term (the F/B value) of the injector jet time obtained in the same manner as in the step S9 of FIG. 2 are integrated (step S31).

Figure 10:
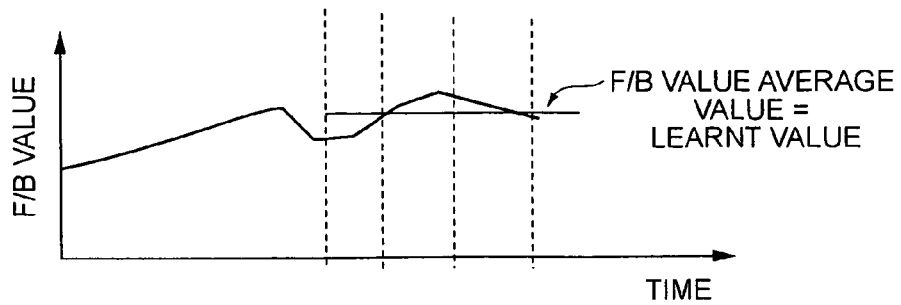
FIG. 10 is a diagram showing processing of steps S31 to S35 of the flow chart shown in FIG. 6.

Subsequently, it is judged whether the number of integration times is a predetermined number of the times or more (step S33). When the number is less than the predetermined number of the times (step S33: NO), the flow returns to the step S21. When the number is the predetermined number of the times or more (step S33: YES), the F/B value of the injector jet time integrated in the step S31 is divided by the number of the integration times to obtain an average value, and this average value of the F/B values is obtained as the present learnt value in the learning zone obtained in the step S23 (step S35, FIG. 10).

The control device 4 learns the driving characteristic of the injector 35 through the above processing. When this driving characteristic is learnt with respect to all of the learning zones 1 to 6, the map shown in FIG. 5 is obtained, and this map is updated for each learning zone at a time when all conditions of the steps S25, S27, S29 and S33 of FIG. 6 are satisfied. This learning result is reflected in setting of the driving parameter (the jet time in the present embodiment) of the injector 35. That is, the control device 4 of the present embodiment is one example of learning means.

As described above, in the fuel cell system 1 according to the present embodiment, the control device 4 not only calculates a difference between the FC inlet target pressure set based on the FC current of the fuel cell 10 and the actual FC inlet pressure detected by the secondary pressure sensor 43, that is, the F/B value for reducing the FC inlet pressure difference but also learns the fluctuations of the FC inlet pressure difference generated owing to the aging and individual difference of the injector 35, based on the FC current, to set the injector jet time based on the learning result.

Therefore, the supply pressure of the hydrogen gas can appropriately be changed in accordance with the operation state during the operation of the fuel cell 10. In addition, even when the pressure is broadly varied, a satisfactory pressure response property can be secured regardless of the fluctuations due to the aging and individual difference of the injector 35. Moreover, the injector 35 functions as a hydrogen gas flow rate adjustment valve and a variable pressure adjustment valve, so that needless to say, precise pressure adjustment can be realized in addition to the improvement of the pressure response property.

Furthermore, in the fuel cell system 1 of the present embodiment, the fluctuations of the FC inlet pressure difference are learnt only in a case where the FC current and the FC inlet pressure are stable, that is, only in the state suitable for the learning. Therefore, it is prevented that fluctuations of the FC inlet pressure difference due to a factor other than the aging and individual difference of the injector 35 are wrongly learnt, and a satisfactory transition characteristic and stability can be secured.

It is to be noted that in the above embodiment, an example has been described in which the current value (the FC current) during the power generation of the fuel cell 10 is detected, and the learnt value is set based on this current value, but the learnt value may be set based on other physical amounts such as a differential value (a change ratio) of the FC current, a voltage value and a power value of the fuel cell 10 during the power generation, the temperature of the fuel cell 10, the primary pressure of the injector 35, the secondary pressure of the injector 35 and a hydrogen flow rate.

Moreover, in the above embodiment, only in a case where the FC current and the FC inlet pressure are stable, the learning is allowed to prevent the wrong learning. However, the control device may judge a configuration of the operation state of the fuel cell 10 (a starting state, an intermittent operation state, a usual operation state, a purge operation state, an abnormal state of the fuel cell itself, an abnormal state of the fuel cell system or the like) to prohibit the learning, for example, in the purge operation state. Even in this case, the wrong learning can be prevented.

Moreover, in the above embodiment, an example in which the fuel cell system according to the present invention is mounted on the fuel cell vehicle S has been described, but the fuel cell system according to the present invention may be mounted on any type of vehicle (a robot, a ship, an airplane or the like) other than the fuel cell vehicle S. The fuel cell system according to the present invention may be applied to a stationary power generation system for use as a power generation equipment for construction (housing, building or the like).

According to the present invention, there can be provided a fuel cell system having a satisfactory pressure response property regardless of aging and individual difference of a gas state variable supply device, and a vehicle. Therefore, the present invention is broadly usable in such demanded fuel cell system and vehicle.

I claim:

1. A fuel cell system comprising:
   a fuel cell;
   a fuel supply source;
   a fuel supply system which supplies a fuel gas to be supplied from the fuel supply source to this fuel cell;
   a gas state variable supply device which is arranged in this fuel supply system and adjusts a gas state of the gas to be supplied to the fuel cell; and
   a control device for driving and controlling the gas state variable supply device in accordance with an operation state of the fuel cell,
   the control device configured to:
      establish a relation between a basic jet time of the gas state variable supply device and an output current of the fuel cell;
      set a plurality of learning zones each corresponding to a different level of the output current of the fuel cell;
      learn a driving characteristic of the gas state variable supply device for each of the plurality of learning zones in accordance with the state of the fuel gas to be supplied to the fuel cell by integrating a correction value for a predetermined number of integration times and by averaging the integrated correction value over the number of integration times, the learning is to obtain a learned value to compensate for changes of the driving characteristic;
      correct a driving parameter, which is set in accordance with the operation state of the fuel cell, of the gas state variable supply device based on a result of the learning; and
      control the gas state variable supply device based on the corrected driving parameter.

2. The fuel cell system according to claim 1, further comprising a current sensor and a pressure sensor, wherein the control device is configured to perform the learning at a time when a change value of the generated current of the fuel cell detected by the current sensor is a first predetermined value or less and change value of the pressure of the fuel gas to be supplied to the fuel cell detected by the pressure sensor is a second predetermined value or less.

3. The fuel cell system according to claim 2, wherein while an off gas of the fuel gas discharged from the fuel cell is purged from the fuel supply system, the control device is configured to prohibit learning by the control device.

4. The fuel cell system according to claim 1, wherein the driving parameter is set based on individual difference of the gas state variable supply device during system manufacturing.

5. The fuel cell system according to claim 1, wherein the gas state variable supply device includes an inner channel which connects the upstream side of the gas state variable supply device to the downstream side thereof, a valve body which is movably arranged in the inner channel and in which an opening area of the inner channel is varied in accordance with a movement position of the valve body, and a valve body driving section which drives the valve body with an electromagnetic driving force.

6. A vehicle which comprises the fuel cell system according to claim 1.

7. A method of controlling a gas state variable supply device in a fuel cell system, comprising:
   providing a fuel cell and a fuel supply source;
   providing a fuel supply system that supplies a fuel gas to be supplied from the fuel supply source to the fuel cell;
   providing the gas state variable supply device in the fuel supply system, the gas state variable supply device to adjust a gas state of the gas to be supplied to the fuel cell;
   driving and controlling the gas state variable supply device by a control device in accordance with an operation state of the fuel cell, wherein the control device is configured to:
      establish a relation between a basic jet time of the gas state variable supply device and an output current of the fuel cell;
      set a plurality of learning zones each corresponding to a different level of the output current of the fuel cell;
      learn a driving characteristic of the gas state variable supply device for each of the plurality of learning zones in accordance with the state of the fuel gas to be supplied to the fuel cell by integrating a correction value for a predetermined number of integration times and by averaging the integrated correction value over the number of integration times, the learning is to obtain a learned value to compensate for changes of the driving characteristic;
      correct a driving parameter, which is set in accordance with the operation state of the fuel cell, of the gas state variable supply device based on a result of the learning; and
      control the gas state variable supply device based on the corrected driving parameter.

8. The method according to claim 7, wherein the fuel cell system comprises a current sensor and a pressure sensor, wherein the control device is configured to perform the learning at a time when a change value of the generated current of the fuel cell detected by the current sensor is a first predetermined value or less and change value of the pressure of the fuel gas to be supplied to the fuel cell detected by the pressure sensor is a second predetermined value or less.

9. The method according to claim 8, wherein learning is to be prohibited while an off gas of the fuel gas discharged from the fuel cell is purged from the fuel supply system.

10. The method according to claim 7, wherein the driving parameter is set based on individual difference of the gas state variable supply device during system manufacturing.

11. The method according to claim 7, wherein the gas state variable supply device includes an inner channel which connects the upstream side to the downstream side, a valve body which is movably arranged in the inner channel and in which an opening area of the inner channel is varied in accordance with a movement position of the valve body, and a valve body driving section which drives the valve body with an electromagnetic driving force.

12. The method according to claim 7, wherein the fuel cell system is installed in a vehicle.

* * * * *